US009330310B2

(12) United States Patent
Jiang et al.

(10) Patent No.: US 9,330,310 B2
(45) Date of Patent: May 3, 2016

(54) METHODS AND DEVICES FOR OBTAINING CARD INFORMATION

(71) Applicant: Tencent Technology (Shenzhen) Company Limited, Shenzhen (CN)

(72) Inventors: Xiucai Jiang, Shenzhen (CN); Hailong Liu, Shenzhen (CN); Jingchao Zhou, Shenzhen (CN); Chao Li, Shenzhen (CN); Bo Chen, Shenzhen (CN); Qi Song, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/484,066

(22) Filed: Sep. 11, 2014

(65) Prior Publication Data
US 2015/0139529 A1 May 21, 2015

Related U.S. Application Data

(63) Continuation of application No. PCT/CN2014/079465, filed on Jun. 9, 2014.

(30) Foreign Application Priority Data

Nov. 21, 2013 (CN) .......................... 2013 1 0594355

(51) Int. Cl.
*G06K 9/00* (2006.01)
*G06K 9/22* (2006.01)
*G06K 9/46* (2006.01)
*G06K 9/62* (2006.01)

(52) U.S. Cl.
CPC ............ *G06K 9/00449* (2013.01); *G06K 9/228* (2013.01); *G06K 9/4633* (2013.01); *G06K 9/4671* (2013.01); *G06K 9/629* (2013.01)

(58) Field of Classification Search
None
See application file for complete search history.

(56) References Cited

U.S. PATENT DOCUMENTS

2002/0030855 A1 3/2002 Okuyama et al.
2005/0087598 A1 4/2005 Yamanaka et al.
(Continued)

FOREIGN PATENT DOCUMENTS

CN 101216924 A 7/2008
CN 101882227 A 11/2010
(Continued)

OTHER PUBLICATIONS

Tencent Technology, ISR, PCT/CN2014/079465, Sep. 9, 2014, 3 pgs.

*Primary Examiner* — Stephen R Koziol
*Assistant Examiner* — Amandeep Saini
(74) *Attorney, Agent, or Firm* — Morgan, Lewis & Bockius LLP

(57) ABSTRACT

A server system with one or more processors and memory obtains, from a client device, a card image which includes an image of a card, and identifies a card configuration type corresponding to the card in the card image based on a database of stored card configuration types. Each stored card configuration type in the database is associated with layout information regarding respective features and information regions for the stored card configuration type. In accordance with the identified card configuration type, the server system determines one or more information regions of the card image containing respective card information of the card. The server system extracts at least a portion of the card information of the card from the one or more information regions of the card image and transmits, to the client device, at least the extracted portion of the card information.

17 Claims, 11 Drawing Sheets

(56) References Cited

U.S. PATENT DOCUMENTS

2011/0305406 A1 12/2011 Huang
2013/0004076 A1* 1/2013 Koo .................. G06K 9/228
 382/176

FOREIGN PATENT DOCUMENTS

| CN | 102231188 A | 11/2011 |
| CN | 102324044 A | 1/2012 |
| CN | 103593642 A | 2/2014 |

* cited by examiner

| | First Tier Features 304 | | | | Second Tier Features 306 | | | | Information Region(s) 308 | | | |
|---|---|---|---|---|---|---|---|---|---|---|---|---|
| Card Type | Orientation | Color Scheme | No. of Lines | ... | Image & Features | Barcode | Logo | ... | Name | Card No. | Expiry Info | CVV Code | ... |
| Card Config. Type 302-1 | <feature type, p1, p2, ...><br><feature type, p1, p2, ...><br><feature type, p1, p2, ...> | <feature type, p1, p2, ...><br><feature type, p1, p2, ...><br><feature type, p1, p2, ...> | 310-1<br>310-2<br>310-N | | <feature type, p1, p2, ...><br><feature type, p1, p2, ...><br><feature type, p1, p2, ...> | <feature type, p1, p2, ...><br><feature type, p1, p2, ...><br><feature type, p1, p2, ...> | 312-1<br>312-2<br>312-N | | <info type, p1, p2, ...><br><info type, p1, p2, ...><br><info type, p1, p2, ...> | <info type, p1, p2, ...><br><info type, p1, p2, ...><br><info type, p1, p2, ...> | 314-1<br>314-2<br>314-N | |
| Card Config. Type 302-2 | <feature type, p1, p2, ...><br><feature type, p1, p2, ...><br><feature type, p1, p2, ...> | <feature type, p1, p2, ...><br><feature type, p1, p2, ...><br><feature type, p1, p2, ...> | 320-1<br>320-2<br>320-N | | <feature type, p1, p2, ...><br><feature type, p1, p2, ...><br><feature type, p1, p2, ...> | <feature type, p1, p2, ...><br><feature type, p1, p2, ...><br><feature type, p1, p2, ...> | 322-1<br>322-2<br>322-N | | <info type, p1, p2, ...><br><info type, p1, p2, ...><br><info type, p1, p2, ...> | <info type, p1, p2, ...><br><info type, p1, p2, ...><br><info type, p1, p2, ...> | 324-1<br>324-2<br>324-N | |
| Card Config. Type 302-3 | <feature type, p1, p2, ...><br><feature type, p1, p2, ...><br><feature type, p1, p2, ...> | <feature type, p1, p2, ...><br><feature type, p1, p2, ...><br><feature type, p1, p2, ...> | 330-1<br>330-2<br>330-N | | <feature type, p1, p2, ...><br><feature type, p1, p2, ...><br><feature type, p1, p2, ...> | <feature type, p1, p2, ...><br><feature type, p1, p2, ...><br><feature type, p1, p2, ...> | 332-1<br>332-2<br>332-N | | <info type, p1, p2, ...><br><info type, p1, p2, ...><br><info type, p1, p2, ...> | <info type, p1, p2, ...><br><info type, p1, p2, ...><br><info type, p1, p2, ...> | 334-1<br>334-2<br>334-N | |
| ... | | | | | ... | | | | ... | | | |

Card Configuration Database 114

Figure 3

METHODS AND DEVICES FOR OBTAINING CARD INFORMATION

RELATED APPLICATIONS

This application is a continuation application of PCT Patent Application No. PCT/CN2014/079465, entitled "Methods and Devices for Obtaining Card Information" filed on Jun. 9, 2014, which claims priority to Chinese Patent Application Serial No. 201310594355.3, entitled "Methods and Devices for Obtaining Card Information," filed on Nov. 21, 2013, the entirety of which are incorporated herein by reference.

FIELD OF THE APPLICATION

The present application relates to the field of Internet technologies, and, more particularly, to a method and device for obtaining card information.

BACKGROUND OF THE APPLICATION

When a user uses a credit card to purchase goods or services, the user needs to input credit card information such as the card number. The input process is time-consuming and has the hidden risk of input error. Therefore, a solution for obtaining card information is a concern of the industry.

The existing technology provides a method for obtaining a credit card number, which includes: The terminal obtains a credit card image, and, according to a preset credit card number region, obtains the image of the region having the credit card number from the credit card image. Then, the terminal analyzes and processes the image of the region having the credit card number and obtains the image of the credit card number. The terminal matches the number in the obtained image of the credit card number with the number in a database and obtains the credit card number of the credit card in the credit card image. However, due to the variation in the possible locations of the region containing the credit card number in different types of cards, the existing technology provides low recognition rates. A better and more accurate method of obtaining card information from card images is needed.

SUMMARY

In realizing the present application, the inventor finds that the existing technology has at least the following problem(s): The position of the image region in which the credit card number is located for different types of credit cards may be different.

In the present application, according to preset information region(s) associated with a card configuration type matching the card in the card image, the information region(s) of the card (e.g., including the card number) are first located in the card image. This results in increased accuracy of the obtained card number.

In some embodiments, a method of obtaining card information is performed at a server system (e.g., server system 108, FIGS. 1 and 2B) with one or more processors and memory. The method includes: obtaining, from a client device (e.g., client device 104, FIGS. 1 and 2A), a card image, where the card image includes an image of a card; and identifying a card configuration type corresponding to the card in the card image based on a database of stored card configuration types (e.g., card configuration database 114, FIGS. 1 and 2B), each stored card configuration type having associated layout information regarding respective features and information regions for the stored card configuration type. In accordance with the identified card configuration type, the method includes determining one or more information regions of the card image, where the one or more information regions contain respective card information of the card. The method also includes extracting at least a portion of the card information of the card from the one or more information regions of the card image. The method further includes transmitting, to the client device, at least the extracted portion of the card information.

In some embodiments, an electronic device or a computer system (e.g., client device 104, FIGS. 1 and 2A and/or server system 108, FIGS. 1 and 2B) includes one or more processors and memory storing one or more programs for execution by the one or more processors, the one or more programs include instructions for performing the operations of any of the methods described herein. In some embodiments, a non-transitory computer readable storage medium storing one or more programs, the one or more programs comprising instructions, which, when executed by an electronic device or a computer system (e.g., client device 104, FIGS. 1 and 2A and/or server system 108, FIGS. 1 and 2B) with one or more processors, cause the electronic device or computer system to perform the operations of any of the methods described herein.

Various advantages of the present application are apparent in light of the descriptions below.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

In order to explain the technical scheme in the embodiments of the present application more clearly, the following will briefly introduce the drawings need to be used in the description of the embodiments, obviously, the drawings in the following description are only some embodiments of the present application, for the common technicians of this field, they can also obtain other drawings according to these drawings without any creative labor.

FIG. 3 is a diagram of a data structure associated with the card configuration database in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make a clearer understanding of purpose, technical scheme and advantages of the present application, the implementation mode of the present application is described in detail below in combination with the attached drawings.

Figure 1:
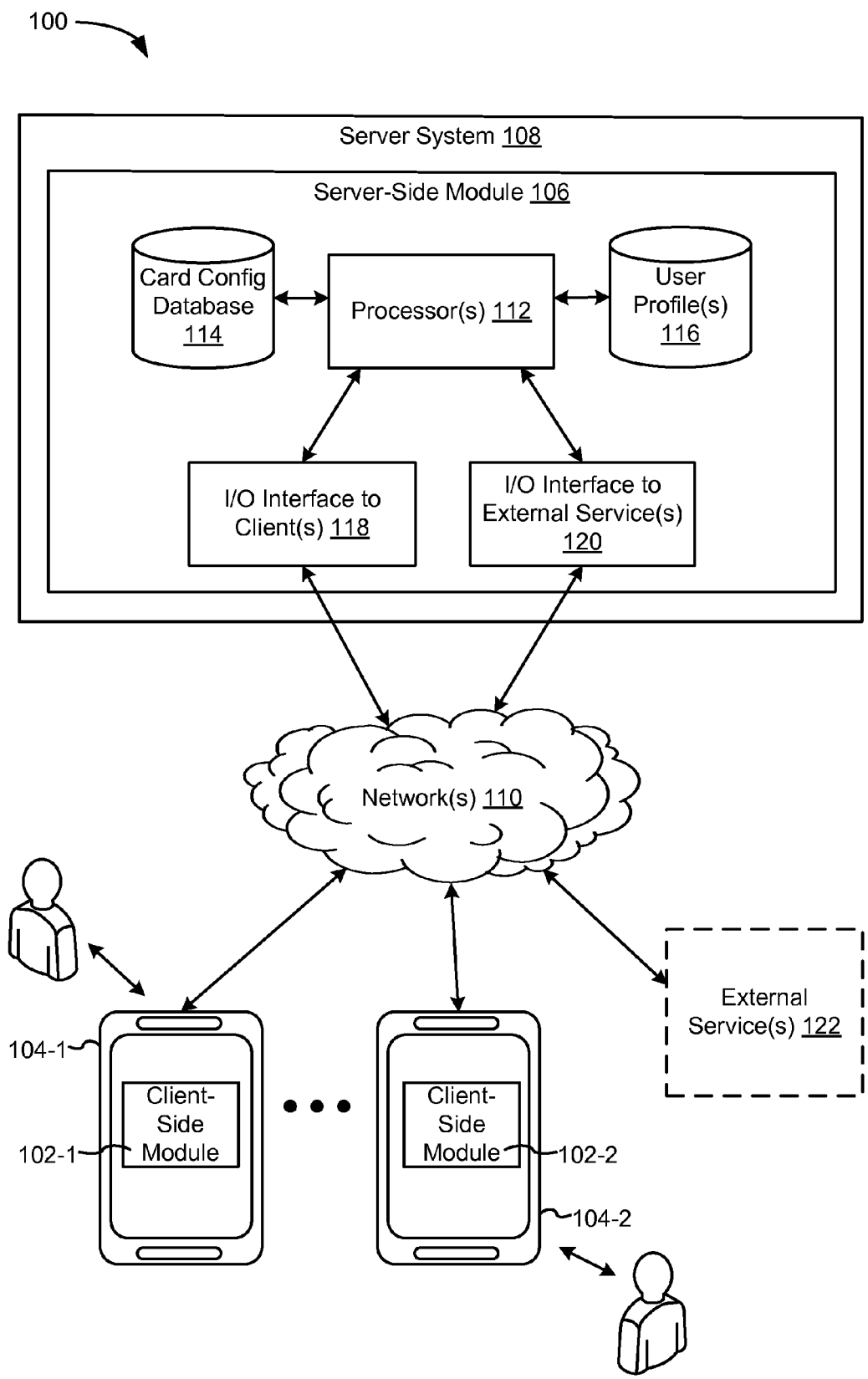
FIG. 1 is a block diagram of a server-client environment in accordance with some embodiments.

As shown in FIG. 1, data processing for a program for obtaining card information from a card is implemented in a server-client environment 100 in accordance with some embodiments. Data processing for obtaining the card information (e.g., name associated with the credit card, credit card number, expiration date, CVV code, etc.) includes client-side processing 102-1, 102-2 (hereinafter "client-side module 102") executed on a client device 104-1, 104-2, and server-side processing 106 (hereinafter "server-side module 106") executed on a server system 108. Client-side module 102 communicates with server-side module 106 through one or more networks 110. Client-side module 102 provides client-side functionalities associated with obtaining the card information such as client-facing input and output processing (e.g., capturing the card image and sending the card image to server system 108) and communications with server-side module 106. Server-side module 106 provides server-side functionalities associated with obtaining the card information (e.g., identifying a card configuration type corresponding to the card image) for any number of client modules 102 each residing on a respective client device 104.

In some embodiments, server-side module 106 includes one or more processors 112, card configuration database 114, one or more user profiles 116, an I/O interface to one or more clients 118, and an I/O interface to one or more external services 120. I/O interface to one or more clients 118 facilitates the client-facing input and output processing for server-side module 106. One or more processors 112 receive card images from client devices 120 and identify a card configuration type corresponding to the card in the card image based on the plurality of stored card configuration types in card configuration database 114. Card configuration database 114 stores a plurality card configuration types, each stored card configuration type having associated layout information regarding respective features and information regions for the stored card configuration type, and one or more user profiles 116 store one or more user profiles each associated with a respective user of a client device, including custom parameters (e.g., age, location, hobbies, etc.), previously obtained card information, and identified trends and/or likes/dislikes. In some embodiments, server-side module 106 communicates with one or more external services 122 (e.g., payment services, membership databases, and vendors of goods and services) through one or more networks 110. I/O interface to one or more external services 120 facilitates such communications.

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks ("LAN") and wide area networks ("WAN") such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Server-client environment 100 shown in FIG. 1 includes both a client-side portion (e.g., client-side module 102) and a server-side portion (e.g., server-side module 106). In some embodiments, data processing is implemented as a standalone application installed on client device 104. In addition, the division of functionalities between the client and server portions of client environment data processing can vary in different embodiments. For example, in some embodiments, client-side module 102 is a thin-client that provides only user-facing input and output processing functions, and delegates all other data processing functionalities to a backend server (e.g., server system 108).

Figure 2A:
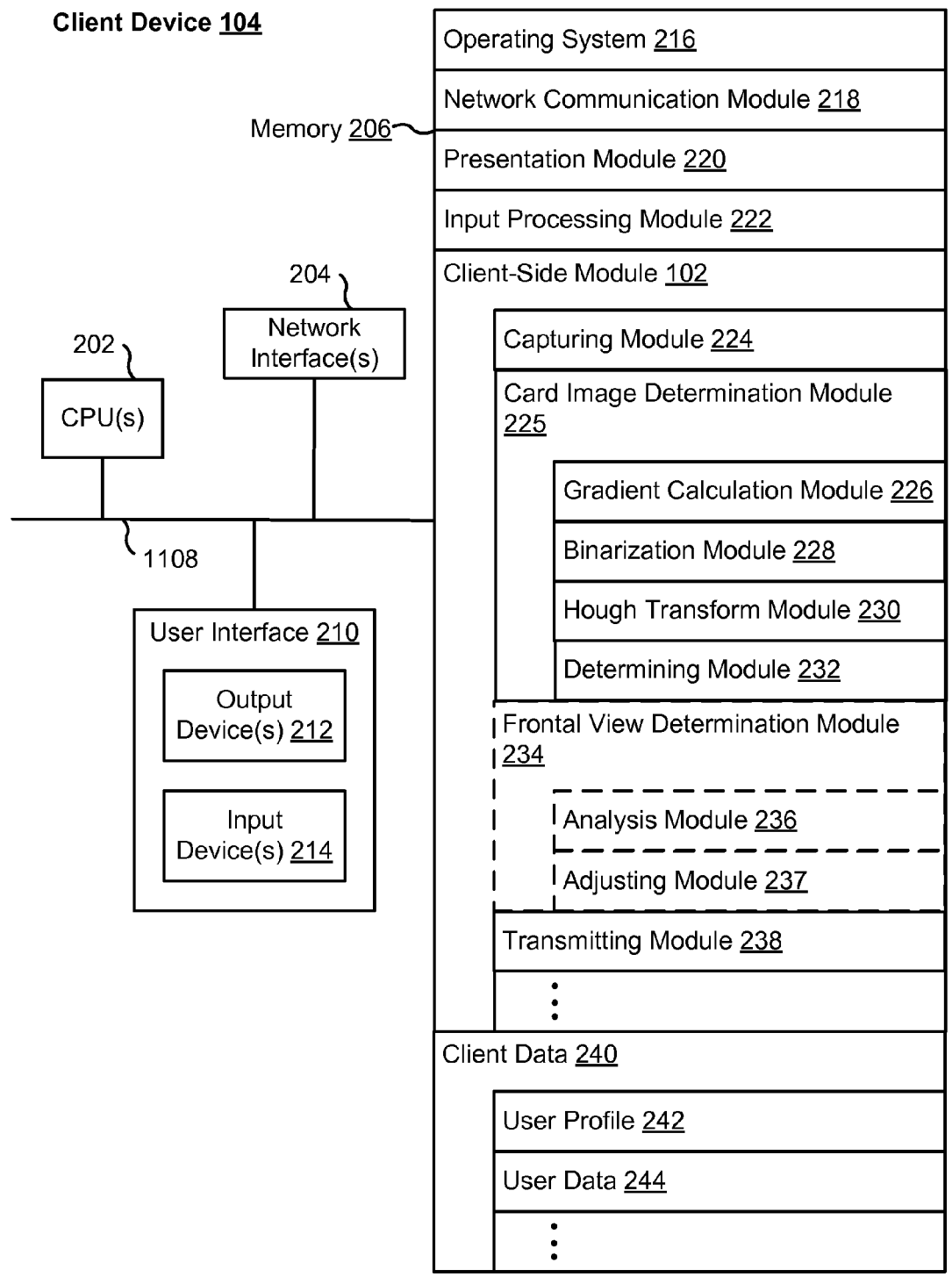
FIG. 2A is a block diagram of a client device in accordance with some embodiments.

FIG. 2A is a block diagram illustrating a representative client device 104 associated with a user in accordance with some embodiments. Client device 104, typically, includes one or more processing units (CPUs) 202, one or more network interfaces 204, memory 206, and one or more communication buses 208 for interconnecting these components (sometimes called a chipset). Client device 104 also includes a user interface 210. User interface 210 includes one or more output devices 212 that enable presentation of media content, including one or more speakers and/or one or more visual displays. User interface 210 also includes one or more input devices 214, including user interface components that facilitate user input such as a keyboard, a mouse, a voice-command input unit or microphone, a touch screen display, a touch-sensitive input pad, a gesture capturing camera, or other input buttons or controls. Furthermore, some client devices 104 use a microphone and voice recognition or a camera and gesture recognition to supplement or replace the keyboard. Memory 206 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 206, optionally, includes one or more storage devices remotely located from one or more processing units 202. Memory 206, or alternatively the non-volatile memory device(s) within memory 206, includes a non-transitory computer readable storage medium. In some implementations, memory 206, or the non-transitory computer readable storage medium of memory 206, stores the following programs, modules, and data structures, or a subset or superset thereof:

operating system 216 including procedures for handling various basic system services and for performing hardware dependent tasks;

network communication module 218 for connecting client device 104 to other computing devices (e.g., server system 108) connected to one or more networks 110 via one or more network interfaces 204 (wired or wireless);

presentation module 220 for enabling presentation of information (e.g., a user interface for a widget, webpage, or an application, audio and/or video content, text, etc.) at client device 104 via one or more output devices 212 (e.g., displays, speakers, etc.) associated with user interface 210; and input processing module 222 for detecting one or more user inputs or interactions from one of the one or more input devices 214 and interpreting the detected input or interaction.

In some embodiments, memory 206 also includes client-side module 102 for performing client-side data processing for obtaining card information from a card (e.g., name associated with the credit card, credit card number, expiration date, CVV code, etc.). Client-side module 102 includes, but is not limited to:

capturing module 224 for capturing an image of a card;

card image determination module 225 for determining whether the captured image is a card image (i.e., the captured images includes the card);

gradient calculation module 226 for calculating the gradient of each pixel in the image (e.g., utilizing vertical and horizontal gradient operators) so as to generate a gradient image;

binarization module 228 for converting the gradient image into a binarized image;

Hough transform module 230 for converting the binarized image into a Hough image using the Hough transform;

determining module 232 for determining whether the Hough image includes two vertical edges and two horizontal edges associated with the card so as to determine whether the captured image is a card image;

frontal view determination module 234 for determining whether the card image includes a frontal view of the card, including but not limited to:

analysis module 236 for determining a pitch angle and a yaw angle associated with the card in the card image or, alternatively, for determining a transformation matrix associated with the card in the card image; and adjusting module 237 for generating a modified card image with a frontal view of the card;

transmitting module 238 for transmitting the card image to server system 108.

In some embodiments, memory 206 also includes client data 240 storing data for obtaining the card information. Client data 240 includes, but are not limited to:

user profile 242 storing a profile associated with the user of client device 104 including custom parameters (e.g., age, location, hobbies, etc.), previously obtained card information, and identified trends and/or likes/dislikes; and user data 244 storing information associated with the program for obtaining card information.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 2B:
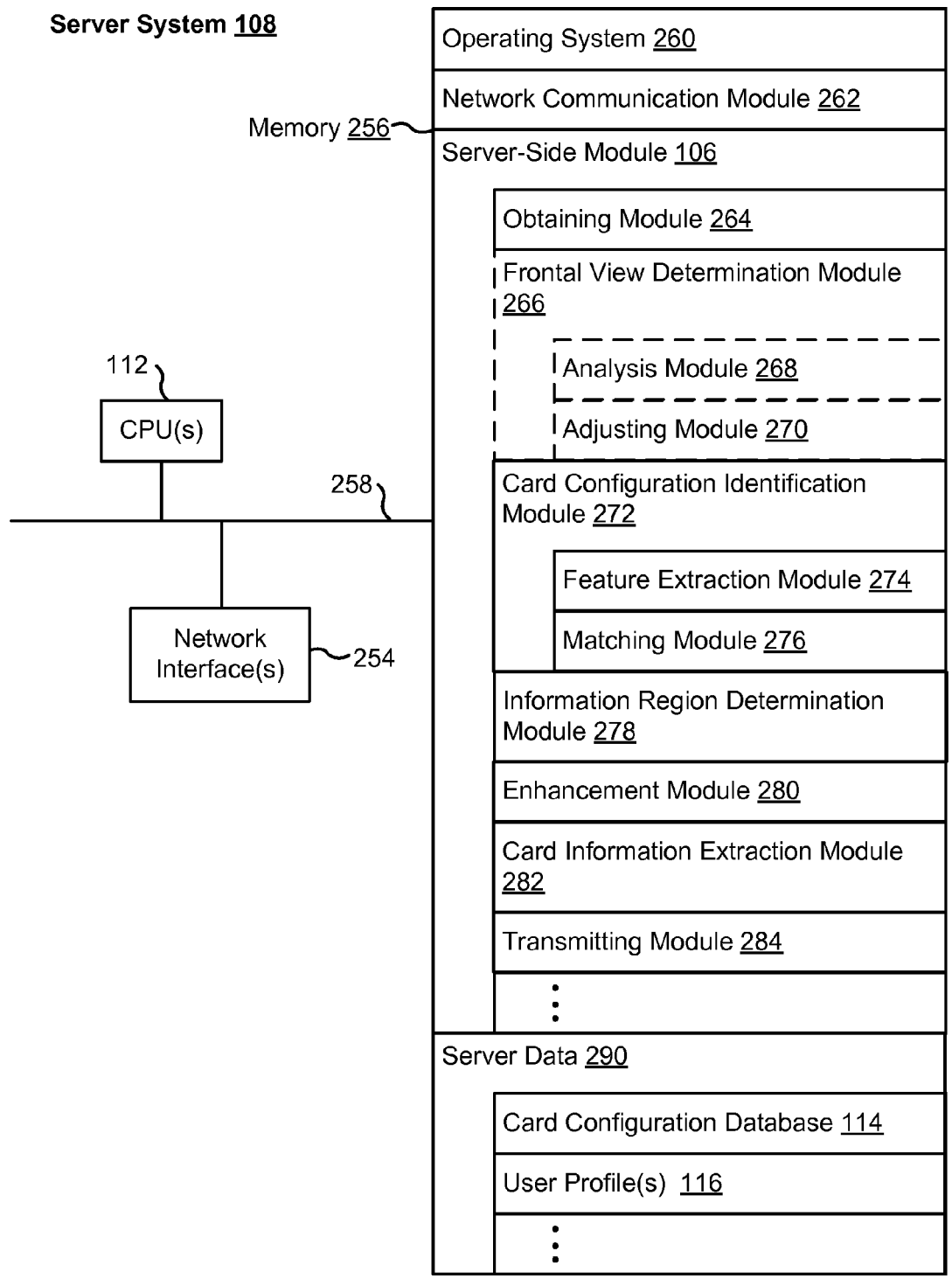
FIG. 2B is a block diagram of a server system in accordance with some embodiments.

FIG. 2B is a block diagram illustrating server system 108 in accordance with some embodiments. Server system 108, typically, includes one or more processing units (CPUs) 112, one or more network interfaces 254 (e.g., including I/O interface to one or more clients 118 and I/O interface to one or more external services 120), memory 256, and one or more communication buses 258 for interconnecting these components (sometimes called a chipset). Memory 256 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 256, optionally, includes one or more storage devices remotely located from one or more processing units 112. Memory 256, or alternatively the non-volatile memory device(s) within memory 256, includes a non-transitory computer readable storage medium. In some implementations, memory 256, or the non-transitory computer readable storage medium of memory 256, stores the following programs, modules, and data structures, or a subset or superset thereof:

operating system 260 including procedures for handling various basic system services and for performing hardware dependent tasks;

network communication module 262 that is used for connecting server system 108 to other computing devices (e.g., client devices 104 and one or more external services 122) connected to one or more networks 110 via one or more network interfaces 254 (wired or wireless);

server-side module 106 for performing server-side data processing for obtaining card information from a card (e.g., name associated with the credit card, credit card number, expiration date, CVV code, etc.), including but not limited to:

obtaining module 264 for obtaining a card image corresponding to a card;

optionally, frontal view determination module 266 for determining whether the card image includes a frontal view of the card, including but not limited to:

analysis module 268 for determining a pitch angle and a yaw angle associated with the card in the card image or, alternatively, for determining a transformation matrix associated with the card in the card image; and adjusting module 270 for generating a modified card image with a frontal view of the card;

card configuration identification module 272 for identifying a card configuration type corresponding to the card, including but not limited to:

feature extraction module 274 for extracting a set of one or more features associated with the card from the card image; and matching module 276 for matching the set of extracted features associated with the card to a second set of features associated with a reference card in card configuration database 114 with a predefined degree of accuracy;

information region determination module 278 determining one or more information regions of the card image according to the identified card configuration type, the one or more information regions contain respective card information of the card;

enhancement module 280 for enhancing the one or more information regions of the card image;

card information extraction module 282 for extracting card information from the one or more information regions of the card image; and transmitting module 284 for transmitting the extracted card information to client device 104; and server data 290 storing data for the obtaining card information, including but not limited to:

card configuration database 114 storing a plurality card configuration types, each stored card configuration type having associated layout information regarding respective features and information regions for the stored card configuration type; and one or more user profiles 116 storing one or more user profiles each associated with a respective user of a client device, including custom parameters (e.g., age, location, hobbies, etc.), previously obtained card information, and identified trends and/or likes/dislikes.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 256, optionally, stores a subset of the modules and data structures identified above. Furthermore, memory 256, optionally, stores additional modules and data structures not described above.

In some embodiments, at least some of the functions of the client-side module 102 are performed by the server-side module 106, and the corresponding sub-modules of these functions may be located within the server-side module 106 rather than the client-side module 102. In some embodiments, at least some of the functions of the server-side module 106 are performed by the client-side module 102, and the corresponding sub-modules of these functions may be located within the client-side module 102 rather than the server-side module 106. The systems shown in FIGS. 2A and 2B are merely illustrative, and different configurations of the modules for implementing the functions described herein are possible in various embodiments.

FIG. 3 is a diagram of a data structure associated with card configuration database 114 in accordance with some embodiments. In some embodiments, card configuration database 114 includes respective layout information corresponding to each of a plurality of card configuration types 302.

In some embodiments, each card configuration type 302 is associated with respective layout information including a plurality of distinct features (e.g., first tier features 304 and second tier features 306). In some embodiments, the plurality of features is separated into first tier features 304 and second tier features 306. For example, first tier features 304 include but are not limited to card type (e.g., credit card, gift card, membership card, ID card, etc.), orientation of card (i.e., portrait or landscape), color scheme of background (e.g., solid, two-tonal, tri-tonal, or multi-colored background with contrasting type) typeface characteristics (e.g., font, color, and size), number of lines in the interior of the card (not including the edges of the card), and so on. For example, second tier features 306 include but are not limited to image(s) and corresponding image feature(s) (e.g., a headshot, background image, etc.), barcode, a logo (e.g., bank emblem, corporate entity's trademark, etc.) and so on.

In accordance with some embodiments, first tier features 304 are easier to identify and search on compared to the second tier features 306 e.g., according to the complexity of the algorithms and the amount of computational resources used. As such, in some embodiments, when server system 108 or a component thereof (e.g., card identification module 272, FIG. 2B) is searching card configuration database 114 for a card configuration type that matches the card in an obtained card image, server system 108 optionally starts by extracting first tier features from the card image and matching the extracted features against the first tier features 304 of card configuration types 302 in card configuration database 114. This enables server system 108 to only extract those features from the card image that are easiest to identify and search on. However, if a match cannot be found by using only the first tier features 304 of card configuration types 302 in card configuration database 114, server system 108 will then extract second tier features from the card image and match the extracted features against the second tier features 306 of card configuration types 302 in card configuration database 114.

For example, in FIG. 3, card configuration database 114 stores respective layout information associated with card configuration type 302-1 (e.g., Dragon Card of the Construction Bank of China) which includes a plurality of first tier features 304. The plurality of first tier features 304 include an entry for feature 310-1 with the type of feature (e.g., background color scheme) and accompanying parameters (p1, p2), an entry for feature 310-2 with the type of feature (e.g., number of interior lines) and accompanying parameters (p1, p2), and an entry for feature 310-N with the type of feature and accompanying parameters (p1, p2). In FIG. 3, respective layout information associated with card configuration type 302-1 also includes a plurality of second tier features 306. The plurality of second tier features 306 include an entry for feature 320-1 with the type of feature (e.g., dragon head image) and accompanying parameters (p1, p2) such as the location of the dragon head image and its geometric shape, an entry for feature 312-2 with the type of feature and accompanying parameters (p1, p2), and an entry for feature 312-N with the type of feature and accompanying parameters (p1, p2).

In some embodiments, each card configuration type 302 is also associated with a respective set of one or more information regions 308. Each of the one or more information regions 308 includes the size and location of an information region that includes card information such as the name associated with the card, card number, expiration date, CVV code, and the like.

For example, in FIG. 3, the respective layout information associated with card configuration type 302-1 includes a respective set of one or more information regions 308. The one or more information regions 308 include an entry for first information region 314-1 with the type of information (e.g., name associated with the card) and accompanying parameters (p1, p2) such as the location of the information region, an entry for second information region 314-2 with the type of information (e.g., card number) and accompanying parameters (p1, p2), and an entry for n-th information region 314-N with the type of information and accompanying parameters (p1, p2).

As an example, Table 1 includes the card configuration type and corresponding information region information indicating the location of one or more information regions associated with the card configuration type. In this example, for the Gold Card of China Merchants Bank the information region is located 4 cm between the upper margin and the upside of card and 4.5 cm between the left margin and the left side of card, and the size of the information region is 3 cm long and 2 cm wide.

TABLE 1

| Card Configuration Type | Information Region(s) |
| --- | --- |
| Gold Card of China Merchants Bank | The distance between the upper margin and the upside of card is 4 cm; the distance between the left margin and the left side of card is 4.5 cm; the region size is 3 cm long and 2 cm wide. |
| Dragon Card of Construction Bank of China | The distance between the upper margin and the upside of card is 1 cm; the distance between the left margin and the left side of card is 1 cm; the region size is 3 cm long and 2 cm wide. |
| ... | ... |

Figure 4:
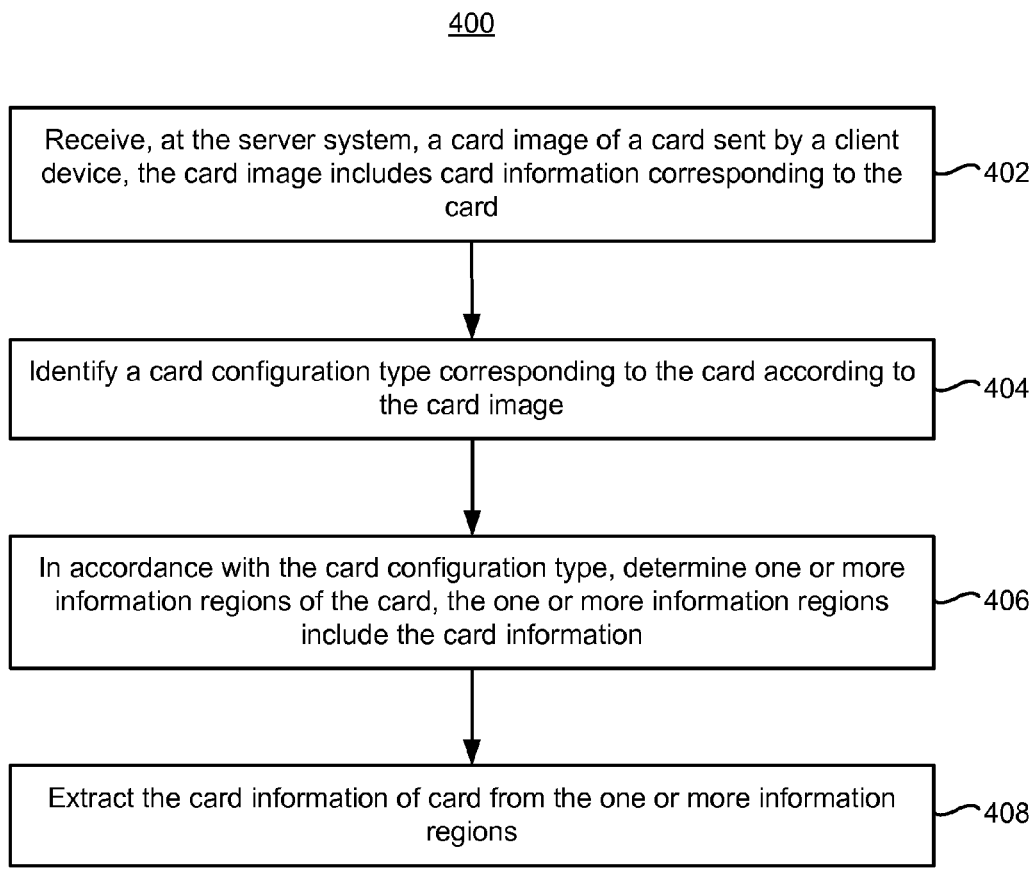
FIG. 4 is a flowchart diagram of a server-side method of obtaining card information application in accordance with some embodiments.

FIG. 4 is a flowchart diagram of a server-side method 400 of obtaining card information in accordance with some embodiments. In some embodiments, method 400 is performed by a server system with one or more processors and memory. For example, in some embodiments, method 400 is performed by server system 108 (FIGS. 1 and 2B) or a component thereof (e.g., server-side module 106, FIGS. 1 and 2B). In some embodiments, method 400 is governed by instructions that are stored in a non-transitory computer readable storage medium and the instructions are executed by one or more processors of the server system.

The server system (402) receives a card image of a card sent by a client device, the card image includes card information corresponding to the card.

The server system (404) identifies a card configuration type corresponding to the card according to the received card image. In some embodiments, server system 108 extracts a set of one or more features from the card image. For example, the set of one or more features includes layout information such as card type, orientation of the card, color scheme, number of lines in the interior of the card, images and accompanying features, barcode, logo, and so on. Subsequently, server system 108 matches the set of one or more features extracted from the card image against a database of stored card configuration types to identify a card configuration type that matches the card in the card image. In some embodiments, a match is only determined when the match meets a predefined degree of accuracy. For example, a count of matching features exceeds a predetermined minimum match count.

In accordance with the card configuration type, the server system (406) determines one or more information regions of the card, the one or more information regions including the card information. In some embodiments, based on the identified card configuration type, server system 108 determines the locations of the one or more information regions of the card in the card image. For example, the one or more information regions include the name associated with the card, card number, expiration date, CVV code, and so on. As such, server system 108 is able to focus on the one or more information regions for extraction of card information rather than scanning the entire card image.

The server system (408) extracts the card information of card from the one or more information regions.

In the embodiment of the present application, the server system identifies the card configuration type corresponding to the card based on the card image and determines one or more information regions of the card according to the identified card configuration type. Therefore, the present application can accurately locate the card information, and according to the one or more information regions of the card, the present application extracts the card information of card from card image, which improves the accuracy rate of obtaining the card information.

Figure 5A:
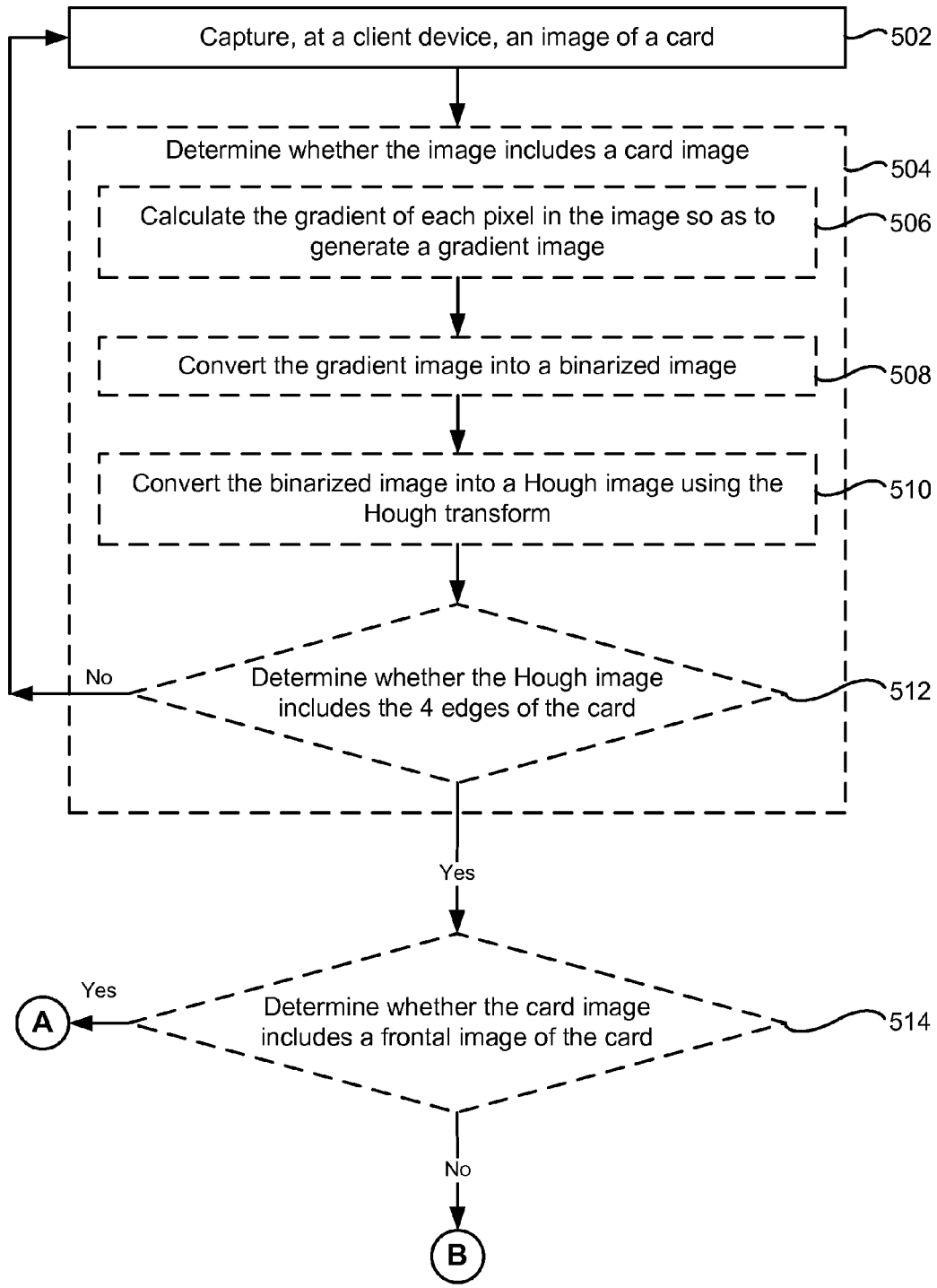
FIGS. 5A-5C are flowchart diagrams of a method of obtaining card information in accordance with some embodiments.
Figure 5B:
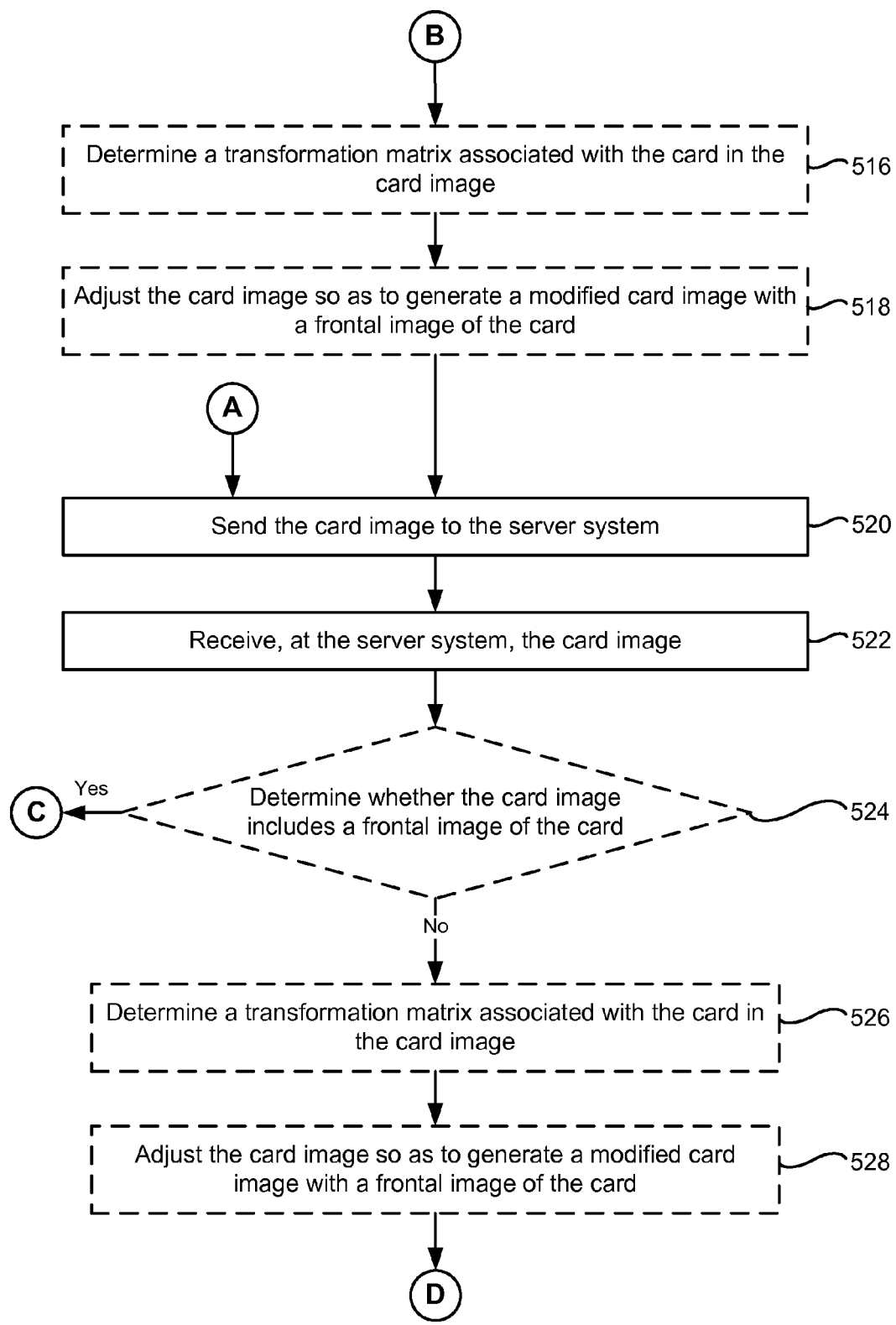
Figure 5C:
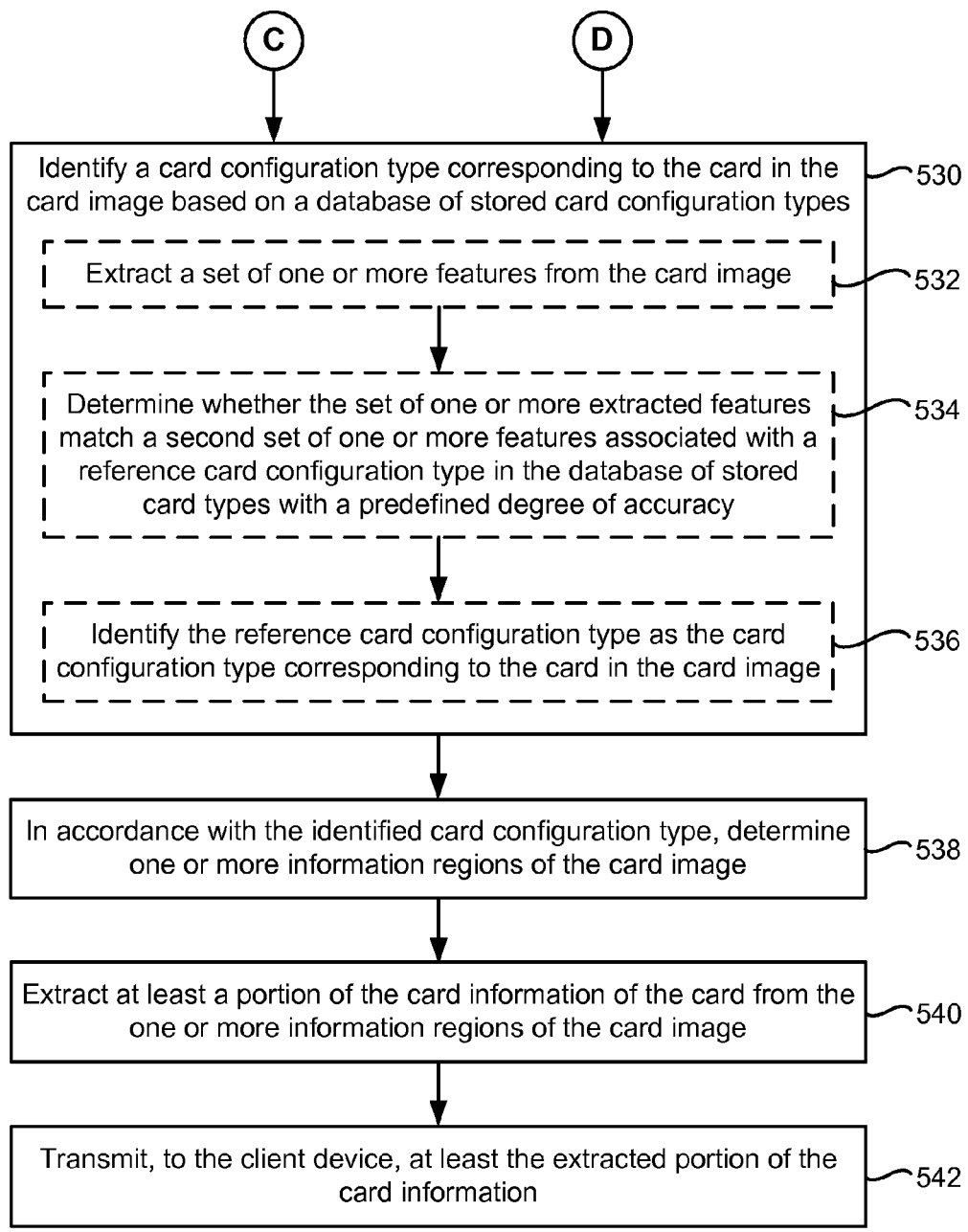

FIGS. 5A-5C are flowchart diagrams of a method 500 of obtaining card information in accordance with some embodiments. In some embodiments, method 500 is performed by a client device with one or more processors and memory and/or a server system with one or more processors and memory. For example, in some embodiments, method 500 is performed by client device 104 (FIGS. 1 and 2A) or a component thereof (e.g., client-side module 102, FIGS. 1 and 2A) and/or server system 108 (FIGS. 1 and 2B) or a component thereof (e.g., server-side module 106, FIGS. 1 and 2B). In some embodiments, method 500 is governed by instructions that are stored in a non-transitory computer readable storage medium and the instructions are executed by one or more processors of client device 104 and/or server system 108. Optional operations are indicated by dashed lines (e.g., boxes with dashed-line borders).

In some embodiments, client device 104 is any electronic device with communication functionality such as a mobile phone, personal computer (PC), and the like. In some embodiments, server system 108 is any server with image processing and recognition functionality.

The client device captures (502) an image of the card. For example, one or more input devices 212 associated with client device 104 includes a camera. Alternatively, in some embodiments, the image was previously captured and is stored by client device 104. In some embodiments, the card is any card that has card information such as a bank card, membership card, ID card, business card, and the like. In some embodiments, the card image is the captured image including the card, and the card information includes information such as card number, expiration date, and/or name.

The client device sends the card image to the server system, and this card image includes the card information of card.

In some embodiments, prior to sending the card image to the server system, the client device determines (504) whether the image includes a card image.

In some embodiments, the steps by which the client device determines whether the image includes a card image includes the following steps (506) to (514):

In some embodiments, the client device calculates (506) the gradient of each pixel in the image so as to generate a gradient image. In some embodiments, client device 104 utilizes vertical and horizontal gradient operators to calculate the gradient of each pixel included in the image.

In some embodiments, the client device converts (508) the gradient image into a binarized image. For example, binarization of the gradient image is performed according to the gradient modulus. Specifically, client device 104 calculates the gradient modulus of each pixel included in the image, sets the gradient modulus of pixel whose gradient modulus is greater than a preset threshold as 255, and sets the gradient modulus of pixel whose gradient modulus is not greater than the preset threshold as 0. Therefore, the client device converts the gradient image into the binarized image. In some embodiments, the preset threshold is set according to requirements and can be changed; as such, the preset threshold value is not specifically limited in the present application.

In some embodiments, the client device converts (510) the binarized image into a Hough image using the Hough transform. In some embodiments, utilizing the duality property of lines in image space and points in the Hough parameter space, the Hough transform transforms the lines in image space to parameter space, conducts accumulated statistics for the pixels included in the line, forms a point in Hough parameter space, and determines whether the image includes straight line through detecting the brightness of points in Hough parameter space.

In some embodiments, the client device determines (512) whether the Hough image includes the four edges of the card. In some embodiments, client device 104 whether the brightness levels of the four points associated with the corners of the card are greater than a preset brightness level. In accordance with a determination that the brightness of the four pointes is greater than the preset brightness level, client device 104 confirms that the Hough image includes the four edges of the card. In accordance with a determination that the brightness of the four points is not greater than the preset brightness level, client device 104 confirms that the Hough image does not include the four edges of the card. In some embodiments, the preset brightness level is set according to requirements and can be changed; as such, the preset brightness level is not specifically limited in the present application.

If the Hough image includes four edges of the card, client device 104 confirms that this image includes card image and the method proceeds to step 514. If the Hough image does not include the four edges of the card, client device 104 confirms that this image does not include card image and the method proceeds back to step 502 or terminates.

In some embodiments, prior to sending the card image of the card to the server system, the client device determines (514) whether the card image is a frontal view of the card. In some embodiments, client device 104 obtains the straight lines of the four edges or sides of the card from the card image and determines whether the directions of the straight lines of the four sides of card are in horizontal direction or vertical direction. If the direction of the straight lines of the two sides of card is in horizontal direction and the direction of the straight lines of the other two sides of card is in vertical direction, the client device confirms that the card image is the frontal view of the card. If the direction of the straight lines of the four sides of card is neither in horizontal direction nor in vertical direction, the client device confirms that the card image is not the frontal view of the card. If the card image is the frontal view of the card, the method proceeds to step 522. If the card image is not the frontal view of the card, the method proceeds to step 516.

When the client device determines that the card image is not the frontal view of the card, the client device performs the following steps (516) to (518):

In some embodiments, the client device determines (516) a transformation matrix associated with the card in the card image. Client device 104 determines the vertex coordinates of the card from the card image. Then, client device 104 calculates the transformation matrix according to the vertex coordinates of card and the standard vertex coordinates. In some embodiments, the standard vertex coordinates of the preset frontal view are (0,0), (0,1), (1,0), and (1,1). The first position is the pixel's position in the card image, and the second position is this pixel's position in the frontal view.

In some embodiments, according to the transformation matrix, the client device adjusts (518) the card image so as to generate a modified card image with the frontal view. In some embodiments, client device 104 confirms the first position of each pixel included in the card image and obtains the second position of each pixel included in the card image. According to the second position of each pixel included in the card image, client device 104 converts the pixels of the card image to the frontal view.

In some embodiments, the product of the vertex coordinates of the card and transformation matrix is the standard vertex coordinates of the frontal view. Therefore, the transformation matrix can be calculated according to the standard vertex coordinates of the frontal view and the vertex coordinates of the card. According to the transformation matrix, client device 104 confirms the position of each pixel included in the card image in the frontal view, sets each pixel included in card image to the corresponding position in the frontal view, thereby composes the pixels in the card image into the frontal view.

Figure 7A:
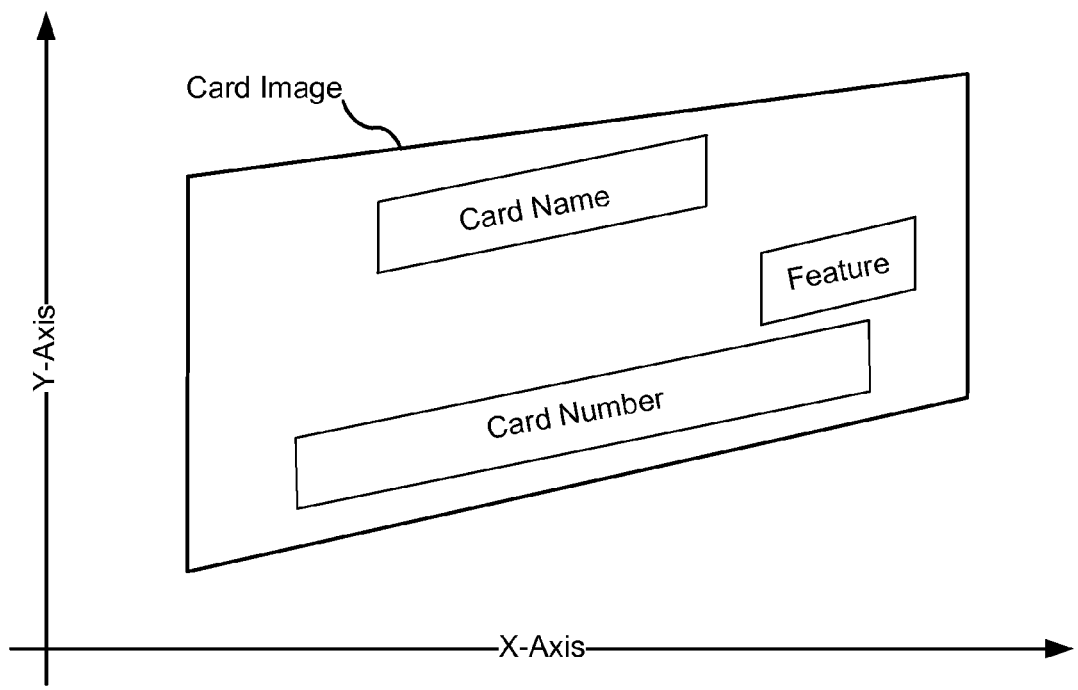
FIG. 7A illustrates an exemplary card image in accordance with some embodiments.
Figure 7B:
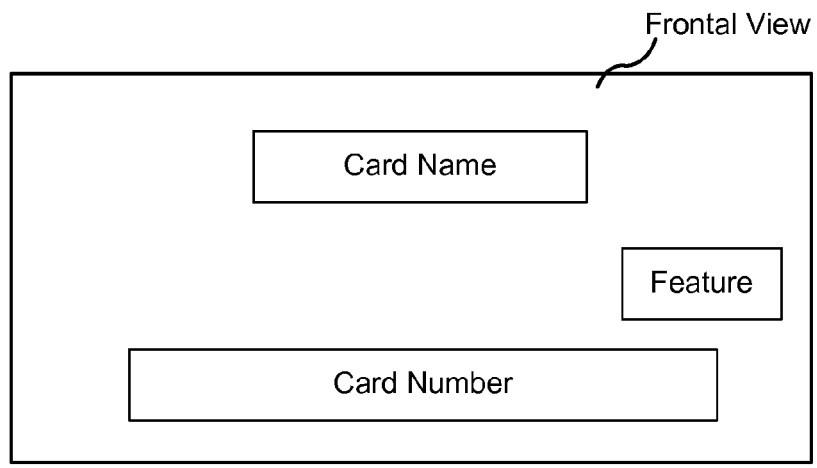
FIG. 7B illustrates an exemplary modified card image with the frontal view of the card in accordance with some embodiments.

For example, the card image is as shown in FIG. 7A. Continuing with this example, after the client device confirms that the card image in FIG. 7A is not the frontal view of the card, client device 104 adjusts the card image and obtains the frontal view of the card as shown in FIG. 7B.

Alternatively, in some embodiments, client device 104 determines the pitch angle associated with the horizontal lines of the card in the card image and the yaw angle associated with the vertical lines of the card in the card image. The pitch angle indicates the amount of degrees that the card in the card image is rotated about the x-axis relative to the preset frontal view, and the yaw angle indicates the amount of degrees that the card in the card image is rotated about the y-axis relative to the preset frontal view. For example, in FIG. 7A, the vertical lines of the card in the card image are rotated about the y-axis. Thus, in this example, the yaw angle needs to be adjusted for the frontal view.

In accordance with a determination that the pitch angle is greater than a first predetermined amount of degrees or that the yaw angle is greater than a second predetermined amount of degrees, client device 104 generates a modified card image with a frontal view of the card. For example, if the pitch angle is off by 35 degrees relative to the preset frontal view, client device 104 generates the modified image with the frontal view by interpolating the pixels of the card image. In some embodiments, client device 104 instructs the user to capture multiple images of the card at varying angles. As such, client device 104 is able to leverage these multiple images for the interpolation process in order to generate a higher resolution modified image instead of merely stretching pixels to generate the modified image.

The client device sends (520) the card image to a server system.

The server system receives (522) the card image of card sent by the client device, where the card image includes an image of a card.

Alternatively, in some embodiments, the server system receives the image captured by the client device in step (502) and determines whether the image includes a card image includes by performing steps (506) to (514). In some embodiments, determining whether the image includes the card image is determined by client device 104. If client device 104 determines that the image includes the card image, server system 108 may not determine whether the image includes the card image.

Optionally, in some embodiments, the server system determines (512) whether the card image is a frontal view of the card. In some embodiments, server system 108 obtains the straight lines of the four edges or sides of the card from the card image and determines whether the directions of the straight lines of the four sides of card are in horizontal direction or vertical direction. If the direction of the straight lines of the two sides of card is in horizontal direction and the direction of the straight lines of the other two sides of card is in vertical direction, server system 108 confirms that the card image is the frontal view of the card. If the direction of the straight lines of the four sides of card is neither in the horizontal direction nor in the vertical direction, the server system 108 confirms that the card image is not the frontal view of the card. If the card image is the frontal view of the card, the method proceeds to step 530. If the card image is not the frontal view of the card, the method proceeds to step 526.

In some embodiments, determining whether the card image is the frontal view of the card is determined by client device 104. If client device 104 determines whether the card image is the frontal view of the card, server system 108 may not determine whether the card image is the frontal view of the card.

When the server system determines that the card image is not the frontal view of the card, the server system performs the following steps (526) to (528):

In some embodiments, the server system determines (526) a transformation matrix associated with the card in the card image. Server system 108 determines the vertex coordinates of the card from the card image. Then, server system 108 calculates the transformation matrix according to the vertex coordinates of card and the standard vertex coordinates.

In some embodiments, according to the transformation matrix, the server system adjusts (528) the card image so as to generate a modified card image with the frontal view. In some embodiments, server system 108 confirms the first position of each pixel included in the card image and obtains the second position of each pixel included in the card image. According to the second position of each pixel included in the card image, server system 108 converts the pixels of the card image to the frontal view.

The server system identifies (530) a card configuration type corresponding to the card in the card image based on a database of stored card configuration types (e.g., card configuration database 114, FIGS. 1 and 2B). In some embodiments, each stored card configuration type is associated with layout information regarding respective features and information regions for the stored card configuration type.

In some embodiments, step (530) includes the following steps (532) to (536):

In some embodiments, the server system extracts (532) a set of one or more features associated with the card from the card image. For example, in some embodiments, server system 108 extracts SIFT (scale-invariant feature transform) features from the card image and obtains a first set of one or more features. In some embodiments, the server system also selects a reference card configuration type from the database of stored card configuration types. Server system 108 obtains from card configuration database 114 a second set of one or more features corresponding to the reference card configuration type.

In some embodiments, the server system determines (534) whether the set of one or more extracted features matches the second set of one or more features associated with a reference card configuration type in the database of stored card types with a predefined degree of accuracy. Server system 108 calculates a count of matching features between the first set of features and the second set of features.

In some embodiments, the server system identifies (536) the reference card configuration type as the card configuration type corresponding to the card in the card image. When the count of matching features is greater than a predetermined minimum match count, server system 108 confirms that the card in the card image corresponds with the reference card configuration type.

When the count of matching features is not greater than the predetermined minimum match count, server system 108 confirms that the card in the card image does not correspond with the reference card configuration type. Further, when server system 108 confirms that the card in the card image does not match the reference card configuration type, server system 108 reselects the reference card configuration type and repeats steps (532) to (536) until server system 108 confirms that the card in the card image matches the reference card configuration type.

Alternatively, in some embodiments, server system 108 extracts a first set of one or more features associated with the card from the card image. Server system 108 selects a respective reference card configuration type in card configuration database 114, and, based on the layout information associated with the respective reference card configuration type, server system 108 determines whether a second set of one or more features of the respective reference card configuration type matches the first set of one or more features associated with the card with a predefined degree of accuracy. In accordance with a determination that the second set of one or more features matches the first set of one or more features with the predefined degree of accuracy, server system 108 identifies the respective reference card configuration type as the card configuration type corresponding to the card in the card image. In some embodiments, the first set of one or more features includes at least one of a set of lines associated with the card (e.g., the four edges of the card and lines internal to the card), one or more colors associated with the card, an orientation associated with the card (e.g., landscape or portrait), one or more images associated with the card, one or more characters associated with the card, and one or more strings of one or more characters associated with the card.

Alternatively, in some embodiments, server system 108 extracts a first set of one or more features associated with the card from the card image. Server system 108 determines a category associated with the card based at least in part on the first set of one or more features. For example, the extracted features indicate that the card in the card image is a membership card; thus, the category is membership cards. In another example, the extracted features indicate that the card in the card image includes 12 interior lines (excluding the edges of the card); thus, the category is cards with 12 interior lines. Alternatively, the category is based at least in part on a current or previous scenario in which the card is being used such as payment of goods or services; thus, the category is payment cards (e.g., credit cards, debit cards, gift cards, etc.). Server system 108 identifies a set of reference card configuration types in card configuration database 114 that are associated with the category. Server system 108 determines whether a second set of one or more features of a reference card configuration type in the set of reference card configuration types matches the first set of one or more features associated with the card with a predefined degree of accuracy. In accordance with a determination that the second set of one or more features matches the first set of one or more features with the predefined degree of accuracy, server system 108 identifies the reference card configuration type as the card configuration type corresponding to the card in the card image.

Alternatively, in some embodiments, server system 108 extracts a first set of features associated with the card from the card image, the first set of features includes one or more first tier features and one or more second tier features. Server system 108 determines a first pool of one or more reference card configuration types from the database of stored card configuration types that include the one or more first tier features associated with the card. In some embodiments, the first tier features are the easiest to identify and/or to search card configuration database 114. Alternatively, the first tier features are the most deterministic/unique features. For example, the first tier features include the number of internal lines (ignoring card edges), color scheme of the background, and orientation associated with the card. In accordance with a determination that the first pool of one or more reference card configuration types includes only a first reference card configuration type, server system 108 identifies the first reference card configuration type as the card configuration type corresponding to the card in the card image. In accordance with a determination that the first pool of reference card configuration types includes two or more reference card configuration types, server system 108 determines, from the first pool of reference card configuration types, a second pool of one or more reference card configuration types that include the one or more second tier features associated with the card. For example, the second tier features includes image(s) and accompanying image feature(s), barcode, and logo associated with the card. In accordance with a determination that the second pool of reference card configuration types includes only a second reference card configuration type, server system 108 identifies the second reference card configuration type as the card configuration type corresponding to the card in the card image.

In accordance with the identified card configuration type, the server system determines (538) one or more information regions of the card image, where the one or more information regions contain respective card information for the card. In some embodiments, according to the identified card configuration type, server system 108 obtains the locations of the one or more information regions associated with the reference card configuration type from card configuration database 114. For example, a respective information region includes the position of the card information relative to the edges or margins of the card and the area occupied by card information in the image.

The server system extracts (540) at least a portion of the card information of from the one or more information regions of the card image. In some embodiments, the server system enhances the one or more information regions with one or more predefined enhancement filters or processes prior to extracting the card information from the one or more information regions.

For example, server system 108 confirms that the type of this card is the gold card of China Merchants Bank, and, according to the location of the information region(s) associated with the gold card of China Merchants Bank specified in card configuration database 114, server system 108 extracts the card information from the card image such as the name associated with the card, card number, and/or expiration information.

In some embodiments, step (540) includes the following steps (540*a*) to (540*c*):

In some embodiments, according to the identified card configuration type, the server system (540*a*) obtains the characters in a standard format from the card image corresponding to the relation between the card configuration type and the characters in the standard format.

In some embodiments, server system 108 saves the corresponding relation between the identified card configuration type and the characters in standard format in card configuration database 114. According to the identified card configuration type, server system 108 obtains the characters in the standard format where the characters included in the characters in standard format are the standard characters corresponding to the identified card configuration type.

The server system obtains (540*b*) image(s) of the determined one or more information regions of card information from the card image.

The server system extracts (540*c*) the card information from the obtained image(s). Specifically, server system 108 extracts the characters included in obtained image(s). Server system 108 calculates a similarity metric between the extracted characters and the characters in standard format. Then, server system 108 composes the characters in the standard format corresponding to the characters with the maximum similarity metric into a character string. In some embodiments, the composed character string is the card information.

In some embodiments, the steps by which the server system extracts the characters from the obtained image(s) include: In some embodiments, the server system adopts the enhancement filter to conduct an enhancement process for the character string included in the obtained image(s). Server system 108 projects the processed image to the longitudinal axis direction and obtains the first projection histogram. According to the first projection histogram, server system 108 confirms the upper and lower margin of the character string included in this obtained image, and obtains the region of the character string. Server system 108 then projects the obtained character string region to the horizontal axis direction and obtains the second projection histogram. According to the second projection histogram and the preset character width, server system 108 segments the character string and extracts the characters. The method of calculating the similarity metric between the extracted characters and the characters in standard format can be any existing method for calculating the similarity and is not specifically limited.

The server system transmits (542) at least the extracted portion of the card information to the client device. In some embodiments, after receiving the card information, the client device presents the received card information corresponding to the card image.

In the embodiment of the present application, the server system identifies the card configuration type corresponding to the card based on the card image and determines one or more information regions of the card according to the identified card configuration type. Therefore, the present application can accurately locate the card information, and according to the one or more information regions of the card, the present application extracts the card information of card from card image, which improves the accuracy rate of obtaining the card information.

Figure 6:
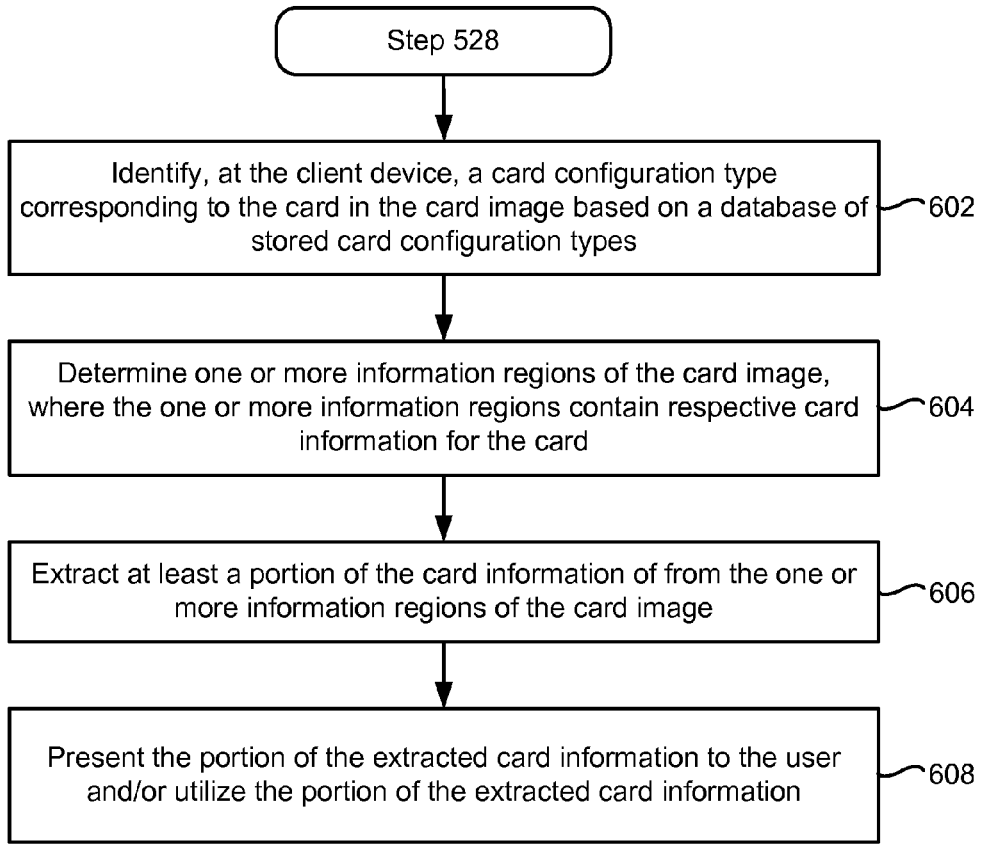
FIG. 6 is a flowchart diagram of a client-side method of obtaining card information application in accordance with some embodiments.

FIG. 6 is a flowchart diagram of a client-side method 600 of obtaining card information in accordance with some embodiments. In some embodiments, method 600 is performed by a client device with one or more processors and memory. For example, in some embodiments, method 600 is performed by client device 104 (FIGS. 1 and 2A) or a component thereof (e.g., client-side module 102, FIGS. 1 and 2A). In some embodiments, method 600 is governed by instructions that are stored in a non-transitory computer readable storage medium and the instructions are executed by one or more processors of client device 104.

Following completion of step (528) described above with reference to method 500, in method 600, the client device performs the following steps (602) to (608):

The client device identifies (602) a card configuration type corresponding to the card in the card image based on a database of stored card configuration types (e.g., a card configuration database stored at client device 104).

The client device determines (604) one or more information regions of the card image, where the one or more information regions contain respective card information for the card.

The client device extracts (606) at least a portion of the card information of from the one or more information regions of the card image.

The client device presents (608) the portion of the extracted card information to the user of client device 104 and/or utilizes the portion of the extracted card information (e.g., to fill out one or more fields associated with a payment process).

The above steps (602) to (606) are the same as steps (530), (538), and (540) discussed with reference to method 500, respectively. Redundant description of steps (530), (538), and (540) will be avoided for sake of brevity.

Figure 8:
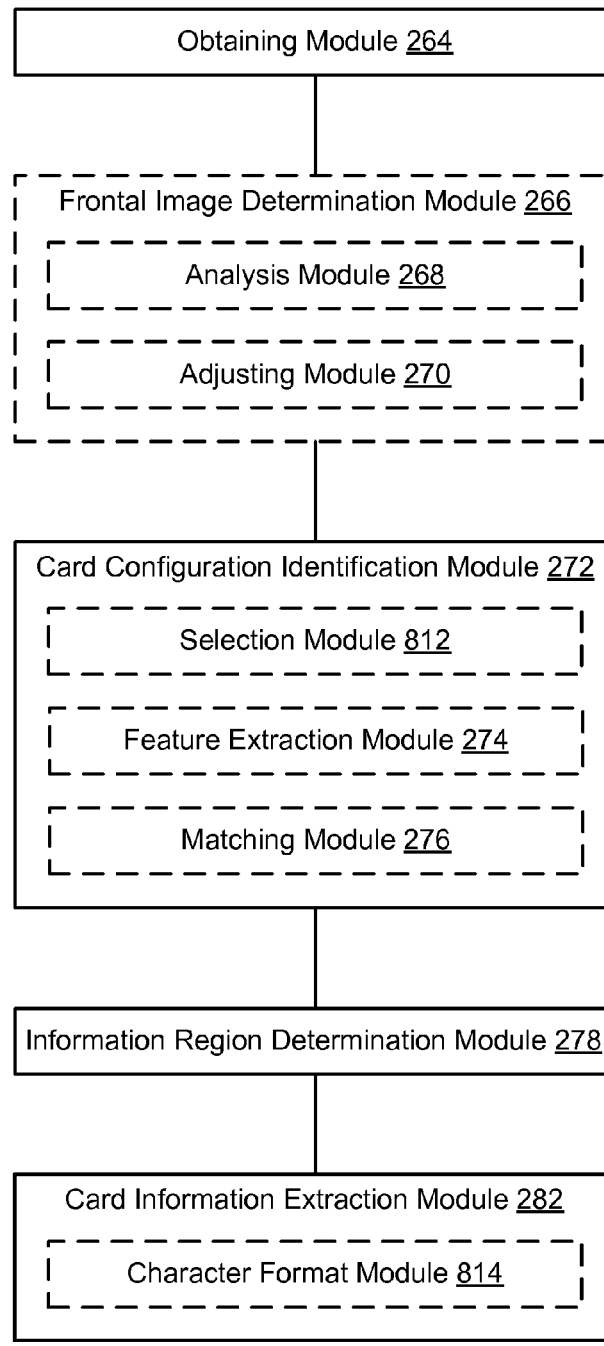
FIG. 8 is a block diagram of a server-side module in accordance with some embodiments.

FIG. 8 is a block diagram of server-side module 106 in accordance with some embodiments. In some embodiments, server-side module 106 is associated with a program for obtaining card information which is executed at server system 108. According to some embodiments, server-side module 106 includes the following modules, or a superset or subset thereof.

In some embodiments, obtaining module 264 is configured to obtain the card image from the client device. The card image includes an image of the card.

Card configuration identification module 272 is configured to identify a card configuration type corresponding to the card in the card image.

In some embodiments, information region determination module 278 is configured to determine one or more information regions of the card image according to the identified card configuration type, the one or more information regions contain respective card information of the card.

In some embodiments, card information extraction module 282 is configured to extract card information from the one or more information regions of the card image.

In some embodiments, card configuration identification module 272 includes the following modules.

Selection module 812 is configured to select a reference card configuration type from card configuration database 114.

Feature extraction module 274 is configured to extract a set of one or more features associated with the card from the card image and obtain a second set of one or more features corresponding to the reference card configuration type.

Matching module 276 is configured to determine whether the set of one or more extracted features matches the second set of one or more features associated with a reference card configuration type in the database of stored card types with a predefined degree of accuracy. In some embodiments, matching module 276 also calculates a count of matching features between the first set of features and the second set of features. When the count of matching features is greater than a predetermined minimum match count, matching module 276 confirms that the card in the card image corresponds with the reference card configuration type.

Further, in some embodiments, server-side module 106 also includes the following modules.

Character format module 814 is configured to obtain, according to the card configuration type, the characters in a standard format from the card image corresponding to the relation between the card configuration type and the characters in the standard format.

Correspondingly, card information extraction module 282 is configured to extract characters from the card image, calculate a similarity metric between the extracted characters and the characters in standard format, compose the characters in the standard format corresponding to the characters with the maximum similarity metric into a character string, and identify this character string as the card information.

Frontal view determination module 266 is configured to determine whether the card image includes a frontal view of the card.

Analysis module 268 is configured to determine, in accordance with a determination that the card image does not include the frontal view, a transformation matrix associated with the card in the card image. In some embodiments, analysis module 268 is configured to obtain the vertex coordinates of card from this card image. Further, in some embodiments, analysis module 268 is configured to calculate the transformation matrix according to the vertex coordinates of card and the standard vertex coordinates.

Adjusting module 270 is configured to generate, according to the vertex coordinates of card and the standard vertex coordinates of the preset frontal view, a modified card image with the frontal view. In some embodiments, adjusting module 270 converts the first position of each pixel included in the card image, and obtains the second position of each pixel included in this card image. According to the second position of each pixel included in this card image, adjusting module 270 composes the pixels of this card image to the frontal view.

In the embodiment of the present application, the server system identifies the card configuration type corresponding to the card based on the card image and determines one or more information regions of the card according to the identified card configuration type. Therefore, the present application can accurately locate the card information, and according to the one or more information regions of the card, the present application extracts the card information of card from card image, which improves the accuracy rate of obtaining the card information.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of obtaining card information, comprising:
   at a server system with one or more processors and memory:
   obtaining, from a client device, a card image, wherein the card image includes an image of a card;
   identifying a card configuration type corresponding to the card in the card image based on a database of stored card configuration types, each stored card configuration type having associated layout information regarding respective features and information regions for the stored card configuration type;
   in accordance with the identified card configuration type, determining one or more information regions of the card image, wherein the one or more information regions contain respective card information of the card;
   extracting at least a portion of the card information of the card from the one or more information regions of the card image; and
   transmitting, to the client device, at least the extracted portion of the card information, wherein identifying the card configuration type includes:
  extracting a first set of features associated with the card from the card image, the first set of features including one or more first tier features;
  determining a first pool of one or more reference card configuration types from the database of stored card configuration types that include the one or more first tier features associated with the card; and
  in accordance with a determination that the first pool of one or more reference card configuration types includes only a first reference card configuration type, identifying the first reference card configuration type as the card configuration type corresponding to the card in the card image.

2. The method of claim 1, wherein identifying the card configuration type includes:
  based on the layout information associated with a respective reference card configuration type in the database of stored card configuration types:
    extracting a first set of one or more features associated with the card from the card image;
    determining whether a second set of one or more features of the respective reference card configuration type matches the first set of one or more features associated with the card with a predefined degree of accuracy; and
    in accordance with a determination that the second set of one or more features matches the first set of one or more features with the predefined degree of accuracy, identifying the respective reference card configuration type as the card configuration type corresponding to the card in the card image.

3. The method of claim 2, wherein the first set of one or more features includes at least one of a set of lines associated with the card, one or more colors associated with the card, an orientation associated with the card, one or more images associated with the card, one or more characters associated with the card, and one or more strings of one or more characters associated with the card.

4. The method of claim 1, wherein identifying the card configuration type includes:
  extracting a first set of one or more features associated with the card from the card image;
  determining a category associated with the card based at least in part on the first set of one or more features;
  identifying a set of reference card configuration types in the database of stored card configuration types associated with the category;
  determining whether a second set of one or more features of a reference card configuration type in the set of reference card configuration types matches the first set of one or more features associated with the card with a predefined degree of accuracy; and
  in accordance with a determination that the second set of one or more features matches the first set of one or more features with the predefined degree of accuracy, identifying the reference card configuration type as the card configuration type corresponding to the card in the card image.

5. The method of claim 1, wherein the first set of features further includes one or more second tier features, and wherein identifying the card configuration type further includes:
  in accordance with a determination that the first pool of reference card configuration types includes two or more reference card configuration types, determining, from the first pool of reference card configuration types, a second pool of one or more reference card configuration types that include the one or more second tier features associated with the card; and
  in accordance with a determination that the second pool of reference card configuration types includes only a second reference card configuration type, identifying the second reference card configuration type as the card configuration type corresponding to the card in the card image.

6. The method of claim 1, further comprising:
prior to identifying the card configuration type, determining whether the card image includes two vertical edges and two horizontal edges of the card.

7. A server system, comprising:
one or more processors; and
memory storing one or more programs to be executed by the one or more processors, the one or more programs comprising instructions for:
  obtaining, from a client device, a card image, wherein the card image includes an image of a card;
  identifying a card configuration type corresponding to the card in the card image based on a database of stored card configuration types, each stored card configuration type having associated layout information regarding respective features and information regions for the stored card configuration type;
  in accordance with the identified card configuration type, determining one or more information regions of the card image, wherein the one or more information regions contain respective card information of the card;
  extracting at least a portion of the card information of the card from the one or more information regions of the card image; and
  transmitting, to the client device, at least the extracted portion of the card information,
  wherein identifying the card configuration type includes:
    extracting a first set of features associated with the card from the card image, the first set of features including one or more first tier features;
    determining a first pool of one or more reference card configuration types from the database of stored card configuration types that include the one or more first tier features associated with the card; and
    in accordance with a determination that the first pool of one or more reference card configuration types includes only a first reference card configuration type, identifying the first reference card configuration type as the card configuration type corresponding to the card in the card image.

8. The server system of claim 7, wherein identifying the card configuration type includes:
  based on the layout information associated with a respective reference card configuration type in the database of stored card configuration types:
    extracting a first set of one or more features associated with the card from the card image;
    determining whether a second set of one or more features of the respective reference card configuration type matches the first set of one or more features associated with the card with a predefined degree of accuracy; and
    in accordance with a determination that the second set of one or more features matches the first set of one or more features with the predefined degree of accuracy, identifying the respective reference card configuration type as the card configuration type corresponding to the card in the card image.

9. The server system of claim 8, wherein the first set of one or more features includes at least one of a set of lines associated with the card, one or more colors associated with the card, an orientation associated with the card, one or more images associated with the card, one or more characters associated with the card, and one or more strings of one or more characters associated with the card.

10. The server system of claim 7, wherein identifying the card configuration type includes:
   extracting a first set of one or more features associated with the card from the card image;
   determining a category associated with the card based at least in part on the first set of one or more features;
   identifying a set of reference card configuration types in the database of stored card configuration types associated with the category;
   determining whether a second set of one or more features of a reference card configuration type in the set of reference card configuration types matches the first set of one or more features associated with the card with a predefined degree of accuracy; and
   in accordance with a determination that the second set of one or more features matches the first set of one or more features with the predefined degree of accuracy, identifying the reference card configuration type as the card configuration type corresponding to the card in the card image.

11. The server system of claim 7, wherein the first set of features further includes one or more second tier features, and wherein identifying the card configuration type further includes:
   in accordance with a determination that the first pool of reference card configuration types includes two or more reference card configuration types, determining, from the first pool of reference card configuration types, a second pool of one or more reference card configuration types that include the one or more second tier features associated with the card; and
   in accordance with a determination that the second pool of reference card configuration types includes only a second reference card configuration type, identifying the second reference card configuration type as the card configuration type corresponding to the card in the card image.

12. The server system of claim 7, wherein the one or more programs further comprise instructions for:
   prior to identifying the card configuration type, determining whether the card image includes two vertical edges and two horizontal edges of the card.

13. A non-transitory computer readable storage medium storing one or more programs, the one or more programs comprising instructions, which, when executed by a server system with one or more processors, cause the server system to perform operations comprising:
   obtaining, from a client device, a card image, wherein the card image includes an image of a card;
   identifying a card configuration type corresponding to the card in the card image based on a database of stored card configuration types, each stored card configuration type having associated layout information regarding respective features and information regions for the stored card configuration type;
   in accordance with the identified card configuration type, determining one or more information regions of the card image, wherein the one or more information regions contain respective card information of the card;
   extracting at least a portion of the card information of the card from the one or more information regions of the card image; and
   transmitting, to the client device, at least the extracted portion of the card information,
   wherein identifying the card configuration type includes:
      extracting a first set of features associated with the card from the card image, the first set of features includes one or more first tier features;
      determining a first pool of one or more reference card configuration types from the database of stored card configuration types that include the one or more first tier features associated with the card; and
      in accordance with a determination that the first pool of one or more reference card configuration types includes only a first reference card configuration type, identifying the first reference card configuration type as the card configuration type corresponding to the card in the card image.

14. The non-transitory computer readable storage medium of claim 13, wherein identifying the card configuration type includes:
   based on the layout information associated with a respective reference card configuration type in the database of stored card configuration types:
      extracting a first set of one or more features associated with the card from the card image;
      determining whether a second set of one or more features of the respective reference card configuration type matches the first set of one or more features associated with the card with a predefined degree of accuracy; and
      in accordance with a determination that the second set of one or more features matches the first set of one or more features with the predefined degree of accuracy, identifying the respective reference card configuration type as the card configuration type corresponding to the card in the card image.

15. The non-transitory computer readable storage medium of claim 14, wherein the first set of one or more features includes at least one of a set of lines associated with the card, one or more colors associated with the card, an orientation associated with the card, one or more images associated with the card, one or more characters associated with the card, and one or more strings of one or more characters associated with the card.

16. The non-transitory computer readable storage medium of claim 13, wherein identifying the card configuration type includes:
   extracting a first set of one or more features associated with the card from the card image;
   determining a category associated with the card based at least in part on the first set of one or more features;
   identifying a set of reference card configuration types in the database of stored card configuration types associated with the category;
   determining whether a second set of one or more features of a reference card configuration type in the set of reference card configuration types matches the first set of one or more features associated with the card with a predefined degree of accuracy; and
   in accordance with a determination that the second set of one or more features matches the first set of one or more features with the predefined degree of accuracy, identifying the reference card configuration type as the card configuration type corresponding to the card in the card image.

17. The non-transitory computer readable storage medium of claim 13, wherein the first set of features further includes one or more second tier features, and wherein identifying the card configuration type further includes:
   in accordance with a determination that the first pool of reference card configuration types includes two or more reference card configuration types, determining, from the first pool of reference card configuration types, a second pool of one or more reference card configuration types that include the one or more second tier features associated with the card; and
   in accordance with a determination that the second pool of reference card configuration types includes only a second reference card configuration type, identifying the second reference card configuration.

* * * * *